United States Patent
Kirschke et al.

(10) Patent No.: US 6,895,934 B2
(45) Date of Patent: May 24, 2005

(54) METHOD FOR DETECTION OF A LEAK IN THE INTAKE MANIFOLD OF AN INTERNAL COMBUSTION ENGINE AND INTERNAL COMBUSTION ENGINE SETUP ACCORDINGLY

(75) Inventors: Frank Kirschke, Wolfsburg (DE); Kai-Uwe Lindemann, Wolfsburg (DE); Helge Bergmann, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/811,369

(22) Filed: Mar. 26, 2004

(65) Prior Publication Data

US 2004/0210379 A1 Oct. 21, 2004

Related U.S. Application Data

(63) Continuation of application No. PCT/EP02/06286, filed on Jun. 7, 2002.

(30) Foreign Application Priority Data

Sep. 28, 2001 (DE) .......................................... 101 47 977

(51) Int. Cl.[7] ................................................. F02M 1/00
(52) U.S. Cl. ....................... 123/434; 123/690; 73/117.3
(58) Field of Search ................................ 123/434, 690, 123/703; 73/117.3, 118.2

(56) References Cited

U.S. PATENT DOCUMENTS

| | | | |
|---|---|---|---|
| 4,957,083 A | 9/1990 | Nakaniwa et al. | 123/436 |
| 5,385,134 A | 1/1995 | Krohm et al. | 123/676 |
| 5,809,965 A | 9/1998 | Atanasyan | 123/339.15 |
| 6,427,527 B1 * | 8/2002 | Langer | 73/118.1 |
| 2004/0139796 A1 * | 7/2004 | Beyer et al. | 73/117.3 |
| 2004/0210379 A1 * | 10/2004 | Kirschke et al. | 701/114 |
| 2005/0000503 A1 * | 1/2005 | Hassdenteufel et al. | 123/672 |

FOREIGN PATENT DOCUMENTS

| | | |
|---|---|---|
| DE | 43 18 640 A1 | 12/1993 |
| DE | 42 25 495 A1 | 1/1994 |
| DE | 43 03 997 A1 | 8/1994 |
| DE | 44 01 887 A1 | 8/1994 |
| DE | 195 37 363 A1 | 7/1996 |
| DE | 199 00 740 A1 | 7/2000 |
| DE | 199 52 736 A1 | 10/2000 |
| DE | 199 46 874 A1 | 4/2001 |
| DE | 100 28 878 A1 | 12/2001 |
| DE | 100 65 474 C1 | 6/2002 |
| EP | 0 411 173 A1 | 7/1989 |
| EP | 0 937 877 A1 | 1/1998 |

* cited by examiner

*Primary Examiner*—John T. Kwon
(74) *Attorney, Agent, or Firm*—Baker Botts L.L.P.

(57) ABSTRACT

The identification of a leak in the intake port (1) of an internal combustion engine (3) with lambda regulation (8) can be performed by the generation of an evaluation signal in accordance with a control signal of the lambda regulation (8) and the monitoring of the evaluation signal with respect to the transgression of a limiting value. If a leak occurs in the intake port (1), the internal combustion engine (3) receives an additional air mass, which is not registered by an air mass sensor (2). The additional air mass is compensated by the lambda regulation (8) by means of an increase in the value of the control signal, in such a way that the likewise increased value of the evaluation signal can be used for identifying leaks in the intake port (1). In this way, it is possible to determine, in particular, if a crank housing ventilation (5) of the internal combustion engine (3) is still connected correctly to the intake port (1).

22 Claims, 1 Drawing Sheet

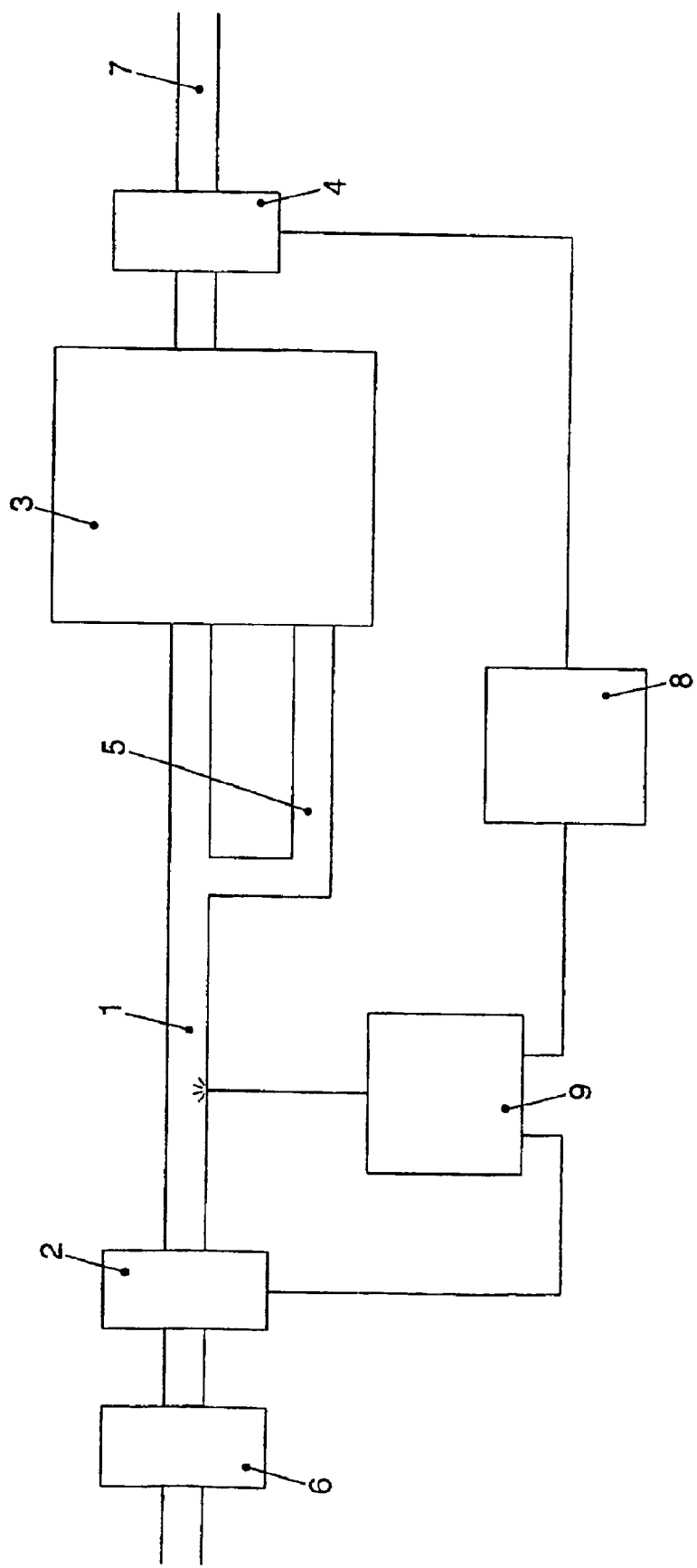

_US 6,895,934 B2_

METHOD FOR DETECTION OF A LEAK IN THE INTAKE MANIFOLD OF AN INTERNAL COMBUSTION ENGINE AND INTERNAL COMBUSTION ENGINE SETUP ACCORDINGLY

CROSS REFERENCE TO RELATED APPLICATION

This application is a continuation of copending International Application No. PCT/EP02/06286 filed Jun. 7, 2002 which designates the United States, and claims priority to German application no. 101 47 977.8 filed Sep. 28, 2001.

TECHNICAL FIELD OF THE INVENTION

The present invention concerns a method for detection of a leak in an intake manifold of an internal combustion engine, as well as an internal combustion engine for execution of the method.

DESCRIPTION OF THE RELATED ART

It is important in current internal combustion engines to supply the engine with a fuel-air mixture with a defined mixing ratio, in order to achieve optimal performance or optimal consumption. A defined fuel-air mixture can also be particularly essential, if the exhausts are to be purified with a catalyst. Generally, the function of the catalyst decidedly depends on the mixing ratio of the employed fuel-air mixture. An air ratio lambda was defined to characterize the mixture composition. It is the ratio of actual fuel-air ratio to the stoichiometric fuel-air ratio. At a lambda value of 1, the fuel is mixed with precisely as much air as is required for its combustion. For catalysts employed nowadays, the engine must be operated in a very narrow range or catalyst window, in which the lambda value amounts to precisely 1, if possible.

In order to be able to maintain the lambda value of the fuel-air mixture as precisely as possible, it is known to operate internal combustion engines with a lambda control. In the first place, the air flowing into the internal combustion engine is determined with an air flow meter and, in the second place, the oxygen content of the exhaust leaving the internal combustion engine after combustion of the fuel is determined with at least one lambda probe. A control determines the supplied amount of fuel from these two quantities. In order to be able to maintain the sought lambda value as well as possible even during changes in load, the required amount of fuel is determined in the control by means of two mechanisms. In the first place, the amount of fuel that produces the desired air ratio with the inflowing amount of air is calculated from the amount of inflowing air. In this manner, a very fast reaction to load changes or changes in inflowing amount of air can be accomplished. However, no feedback occurs, disadvantageously, in this mechanism as to whether the desired lambda value is actually reached. For example, the air ratio of the mixture can fluctuate, owing to different fuel quality or fuel compositions with equivalent fuel-air ratio. In order to compensate for fluctuations as a result of different fuel compositions or imprecision in determination of the inflowing amount of air, a superimposed lambda control is provided that influences the amount of supplied fuel as a function of the lambda value measured at the outlet of the engine. Determination of the amount of fuel as a function of inflowing amount of air therefore represents a control, whereas influencing the amount of fuel as a function of the measured lambda value represents regulation with a closed control loop.

Ideally, lambda regulation must influence the amount of fuel only slightly or not at all, if the amount of fuel required to achieve the desired lambda value at a specific amount of inflowing air is precisely allocated.

It is then of great importance that the amount of air flowing into the engine be precisely determined. For this reason, it is important to detect leaks in the intake manifold of the internal combustion engine. A crankcase vent is also often connected to the intake manifold, so that a leak develops in the intake manifold that can lead to defective function of the in the intake manifold during a defective connection between the intake manifold and the crankcase vent.

SUMMARY OF THE INVENTION

A method for detection of a leak in an intake manifold of an internal combustion engine, comprises the steps of:

determining a supplied amount of fuel as a function of the amount of air flowing through the intake manifold at an air flow measurement site and a reference signal of a lambda control, measuring the oxygen content of the exhaust of the internal combustion engine after combustion;

influencing the reference signal, so that the oxygen content of the exhaust assumes a certain value, and monitoring the evaluation signal with reference to surpassing or falling short of a threshold, wherein the evaluation signal is generated as a function of the reference signal of the lambda control.

The dependence of the supplied amount of fuel on the inflowing amount of air can be a specified stoichiometric ratio between the air amount and fuel amount. The detection of a leak in the intake manifold can be carried out during idle of the internal combustion engine. The evaluation signal can be generated by multiplication of the reference signal of the lambda controller by at least one correction value, which is generated as a function of at least one adaption value that is generated by the lambda control in specific operating phases of the internal combustion engine and used to influence the reference signal of the lambda control. The at least one correction value can be generated as a function of the change of at least one adaption value. A multiplicative adaption value can be generated that has a multiplicative effect during determination of the reference signal. An additive adaption value can be generated that acts additively during determination of the reference signal. The evaluation signal can be generated by multiplication of the reference signal of the lambda controller with a height correction value that is generated as a function of the level at which the internal combustion engine is situated. The evaluation signal can also be generated by multiplication of the reference signal of the lambda controller with a temperature correction value that is generated as a function of the temperature of the internal combustion engine. During the period of a measurement window, a first time period can be measured, in which the evaluation signal exceeds the threshold value, and a second time period can be determined, in which the reference signal falls short of the threshold value, the difference between the first and the second time periods is referred to the duration of the measurement window to obtain a reference quantity, and the reference quantity and is compared with an error threshold to detect a leak in the intake manifold. The total time of the measurement window may last 8 seconds and detection of a leak can only be permitted after a minimum time period of 4 seconds.

An internal combustion engine comprises an intake manifold, a control device and a lambda control, in which the control device is set up so that it determines the amount of air flowing through the intake manifold by means of an air flow meter and determines a supplied amount of fuel as a function of the determined amount of air and a reference signal of the lambda control, and the lambda control is set up, so that it measures the oxygen content of the gas of the internal combustion engine by means of a lambda probe and influences the reference signal, so that the oxygen content assumes a specific value and the control device is also set up, so that it generates an evaluation signal as a function of the reference signal of the lambda control and monitors it with reference to surpassing or falling short of a threshold value.

The dependence of the supplied amount of fuel on the inflowing amount of air can be a specified stoichiometric ratio between the air amount and fuel amount. The control device may operates during idle of the internal combustion engine. The evaluation signal can be generated by multiplication of the reference signal of the lambda controller by at least one correction value, which is generated as a function of at least one adaption value that is generated by the lambda control in specific operating phases of the internal combustion engine and used to influence the reference signal of the lambda control. The at least one correction value can be generated as a function of the change of at least one adaption value. The control device may generate a multiplicative adaption value that has a multiplicative effect during determination of the reference signal. The control device may also generate an additive adaption value that acts additively during determination of the reference signal. The control device may further generate the evaluation signal by multiplication of the reference signal of the lambda controller with a height correction value that is generated as a function of the level at which the internal combustion engine is situated. The control device may also generate the evaluation signal by multiplication of the reference signal of the lambda controller with a temperature correction value that is generated as a function of the temperature of the internal combustion engine. During the period of a measurement window, the control device may measure a first time period, in which the evaluation signal exceeds the threshold value, and may determine a second time period, in which the reference signal falls short of the threshold value, the difference between the first and the second time periods is referred to the duration of the measurement window to obtain a reference quantity, and the control device compares the reference quantity with an error threshold to detect a leak in the intake manifold. The total time of the measurement window may last 8 seconds and detection of a leak can only be permitted after a minimum time period of 4 seconds.

It is assumed according to the invention that the amount of fuel required to achieve the desired lambda value is essentially metered properly as a function of the determined inflowing amount of air. If, under these conditions, the lambda regulation must make a particularly strong intervention, in order to achieve the desired lambda value, this can be used as an indication that more air than the determined amount of air is flowing into the internal combustion engine and therefore a leak in the intake manifold of the internal combustion engine is present. This method, in principle, is usable, regardless of the sought lambda value. It can be used both during lean operation of the internal combustion engine, in which the reference value of the lambda value lies above 1, and also in the now most commonly used regulation method, in which a lambda value of 1 is sought. In a particularly simple practical example of the invention, the evaluation signal can be equal to the reference signal of the lambda regulation.

This method is advantageously conducted in an operating section of the internal combustion engine, in which no load changes occur. In particular, this can be operation at idle. In this way, a stationary state of the regulation is achieved, in which no disturbances occur from transient processes in the regulation or control.

Different adaption that are determined in specific learning phases and used to influence the reference signal can be used in the lambda regulation, in order to achieve a control intervention during determination of the amount of fuel, whose necessity is known from the outset. The allocated amount of fuel can then be calculated by means of the adaption values and the value of the lambda controller. For example, it can be considered in this way when the employed fuel has a particularly low quality, so that a higher amount of fuel must be allocated. By means of the adaption value, a situation can be achieved in which the lambda controller can always be operated in an optimal working range, and especially around the neutral position. The adaption values can be both multiplicative and additive adaption values. An additive adaption value can be used, in particular, in order to achieve a correct operation of the internal combustion engine in idle or at very low load. In multiplicative adaption value, it can be used, in particular in the partial load range.

If adaption values are used, these must be considered during performance of the method according to the invention. The evaluation signal then consists of the reference signal of the lambda control and correction factors that depend on the optionally present and active adaption values. For each adaption value, a correction value is then generated, in which a correction value that operates multiplicatively is generated for each multiplicative and each additive adaption value. In order to generate a multiplicative correction value for and additive adaption value, a corresponding calculation procedure must be used. For this purpose, an additive adaption value can also be initially converted to a multiplicative value.

It is also conceivable not to use the absolute values of the adaption values during formation of the evaluation signal, but to employ the changes in mixture adaption values.

Correction values that are generated as a function of the level at which the internal combustion engine is operated, or the temperature of the internal combustion engine, can also be introduced.

To detect a leak or evaluate the evaluation signal, a time window can be defined, within which detection is carried out. A first time period is then measured, in which the evaluation signal lies above an upper threshold, and a second time period, in which the evaluation signal lies below a lower threshold. The time differences between these two time intervals can then be determined and referred to the time of the measurement window, in order to obtain a dimensionless reference quantity.

If no leak occurs, then the evaluation signal does not exceed the threshold value, or only does so for a very short time. The second time interval is therefore much greater than the first time interval, so that a negative difference is produced that gives a value of almost −1, referred to the measurement window length. In the case of the leak, the evaluation signal lies far above the threshold value, so that a large positive difference of the two time periods is produced, which can, at a maximum, be equal to the length of the measurement window. After being referred to the length of the measurement window, a value of almost +1 is obtained in such a case. A value of 0.8 is advantageously introduced as final error threshold.

However, during the diagnosis process for leak detection, the difference between the two time periods, however, is calculated continuously and referred to the actual measurement window time. In this manner, during the diagnosis process, a value for the reference quantity is already present from the outset. Comparison between the dimensionless reference quantity and the error threshold can occur in such a case even after a minimum measurement time, which can be smaller than the measurement window length. In a simple error situation, a very rapid error detection is thus possible.

The lower and upper threshold values can be equal, but can also be separated by a safety distance to avoid incorrect diagnoses. If one lies with the evaluation signal between the thresholds, the value of the dimensionless reference quantity drops, because of reference to the continuously rising measurement window time, so that one is separated from a possibly incorrect error input.

BRIEF DESCRIPTION OF THE DRAWINGS

The invention is further explained below by means of a preferred practical example with reference to the accompanying drawing.

The FIGURE shows a schematic layout of an internal combustion engine together with the components necessary to execute the method according to the invention, according to the practical example of the present invention.

DETAILED DESCRIPTION OF THE PREFERRED EMBODIMENTS

In the functional diagram, an internal combustion engine 3 with an intake manifold 1 and an exhaust manifold 7 is shown. Air necessary for combustion is drawn in through intake manifold 1, whereas the combustion gases are expelled through exhaust manifold 7.

In the intake manifold 1, an air filter 6 to clean the incoming air, and then an air flow meter 2 are arranged frontmost. The air flow meter 2 determines the amount of air flowing into intake manifold 1 per unit time.

The internal combustion engine 3 is a reciprocating engine with a crankcase, to which a crankcase vent 5 is connected. The crankcase vent 5 serves to draw off fuel vapors that go past the piston into the crankcase. For this purpose, the crankcase vent 5 is connected to the intake manifold 1.

A lambda probe 4 is arranged in the exhaust manifold 7, in order to measure the oxygen content of the combustion gases.

A lambda control 8 and a control device 9 are also provided, in order to determine the amount of fuel required for operation of the internal combustion engine 3. The control device 9 is connected for this purpose to the air flow meter 2, which sends the result of air flow measurement to the control device 9. The control device 9 also receives a reference signal from the lambda control 8, which is again connected to lambda probe 4. The lambda control 8 is laid out, so that, by means of the reference signal fed to the control device 9, it influences the fuel-air mixture flowing into the internal combustion engine 3, so that the oxygen content of the combustion gases assumes a specified reference value.

The control device 9, on the other hand, is set up, so that it calculates the required amount of fuel as a function of the amount of air determined in the air flow meter 2, which is required to achieve the desired lambda value. The reference signal of lambda control 8 is additionally considered. A check whether the sought lambda value is achieved with the allocated fuel amount is not carried out by the control device 9. This is achieved by means of lambda control 8, which forms a closed control loop via intervention in control 9.

If intake manifold 1 has no leak, the control device 9 can calculate the required amount of fuel, with reference to the measured amount of air, with a certain accuracy. Deviations can be produced, especially by imprecision in air flow measurement, component deviations, altered combustion conditions or changes in fuel composition. The deviations of fuel amount, determined based on air amount, from the ideal fuel amount are compensated by the lambda control 8 or the reference signal. However, only a small control intervention of the lambda control 8 is then required, since the control device 9 can determine a sufficiently good value for fuel amount already with reference to the measured air amount.

If, however, a leak occurs within intake manifold 1, more air than can be measured by the air flow meter 2 flows into the internal combustion engine 3. The result of this is that the control device 9 allocates an unduly small amount of fuel for the measured amount of air actually flowing into the internal combustion engine 3. This leads to an unduly high oxygen percentage in the combustion gases. The lambda control 8 then seeks to compensate for this deviation by causing an increase in the amount of fuel in control device 9 by means of the reference signal. The leak in the intake manifold 1 leads to an unusually high value of the reference signal, since the lambda control 8 seeks, by mean of the reference signal, to allocate a fuel fraction for the leakage air that cannot be considered together with the air measurement by the control device 9.

The control device 9 is also laid out, so that it can generate and monitor an evaluation signal as a function of the reference signal of the lambda control 8. The evaluation signal is generated by the control device by multiplication of the reference signal of the lambda control 8 by correction factors. The correction factors are dependent on the level at which the internal combustion engine 3 is operated, the temperature of the internal combustion engine 3 and are dependent on the adaption values.

The adaption values are generated by the control device 9 in learning phases and considered during determination of the reference signal, in order to consider slowly changing medium-term or long-term effects on the required fuel amount. These effects, for example, can be fuel quality, component tolerances or varying combustion conditions. It is possible, by means of the adaption values, to keep the reference signal of the lambda control 8 in an optimal range, and especially in the vicinity of the neutral position. Both additive, in which control signal determination is considered additive, as well as multiplicative, in which control signal determination is considered multiplicatively, adaption values are generated by the control device 9, in which the additive adaption components are used in idle and the multiplicative adaption values in the partial load range.

For evaluation of the evaluation signal, a measurement window with a duration of 8 seconds is provided in the control device 9 in an idle phase of the internal combustion engine 3. During the period of this measurement window, the control device 9 monitors whether the evaluation signal of the lambda control 8 surpasses an upper threshold or falls short of a lower threshold. The control device 9 then measures a first time period, in which the evaluation signal surpasses the upper threshold, and a second time period, in which the lower threshold is fallen short of. The time period, in which the evaluation signal lies between these two threshold values, is left out of consideration. In this manner, a situation can be achieved in which incorrect detection of a leak in the intake manifold 1 does not occur in uncertain cases.

During the duration of the measurement window, the second time period is continuously subtracted from the first time period and the obtained difference, referred to the time period of the measurement window. The result is a ratio that fluctuates between −1 and +1, depending on the two time periods. This ratio is compared from a minimum measurement time, and especially 4 seconds, with an error threshold, whose value is 0.8, and an error signal is generated, if the ratio lies above the error threshold.

A leak in the intake manifold 1 is therefore recognized when the evaluation signal of the lambda control 8 lies above the upper threshold for a long time, i.e., the lambda control 8 attempts to supply additional fuel over a long period.

We claim:

1. A method for detection of a leak in an intake manifold of an internal combustion engine, comprising the steps of:

determining a supplied amount of fuel as a function of the amount of air flowing through the intake manifold at an air flow measurement site and a reference signal of a lambda control, measuring the oxygen content of the exhaust of the internal combustion engine after combustion;

influencing the reference signal, so that the oxygen content of the exhaust assumes a certain value, and monitoring the evaluation signal with reference to surpassing or falling short of a threshold, wherein the evaluation signal is generated as a function of the reference signal of the lambda control.

2. The method according to claim 1, wherein the dependence of the supplied amount of fuel on the inflowing amount of air is a specified stoichiometric ratio between the air amount and fuel amount.

3. The method according to claim 1, wherein the detection of a leak in the intake manifold is carried out during idle of the internal combustion engine.

4. The method according to claim 1, wherein the evaluation signal is generated by multiplication of the reference signal of the lambda controller by at least one correction value, which is generated as a function of at least one adaption value that is generated by the lambda control in specific operating phases of the internal combustion engine and used to influence the reference signal of the lambda control.

5. The method according to claim 4, wherein the at least one correction value is generated as a function of the change of at least one adaption value.

6. The method according to claim 4, wherein a multiplicative adaption value is generated that has a multiplicative effect during determination of the reference signal.

7. The method according to claim 4, wherein an additive adaption value is generated that acts additively during determination of the reference signal.

8. The method according to claim 1, wherein the evaluation signal is generated by multiplication of the reference signal of the lambda controller with a height correction value that is generated as a function of the level at which the internal combustion engine is situated.

9. The method according to claim 1, wherein the evaluation signal is generated by multiplication of the reference signal of the lambda controller with a temperature correction value that is generated as a function of the temperature of the internal combustion engine.

10. The method according to claim 1, wherein during the period of a measurement window, a first time period is measured, in which the evaluation signal exceeds the threshold value, and a second time period is determined, in which the reference signal falls short of the threshold value, the difference between the first and the second time periods is referred to the duration of the measurement window to obtain a reference quantity, and the reference quantity and is compared with an error threshold to detect a leak in the intake manifold.

11. The method according to claim 10, wherein the total time of the measurement window lasts 8 seconds and detection of a leak is only permitted after a minimum time period of 4 seconds.

12. An internal combustion engine comprising an intake manifold, a control device and a lambda control, in which the control device is set up so that it determines the amount of air flowing through the intake manifold by means of an air flow meter and determines a supplied amount of fuel as a function of the determined amount of air and a reference signal of the lambda control, and the lambda control is set up, so that it measures the oxygen content of the gas of the internal combustion engine by means of a lambda probe and influences the reference signal, so that the oxygen content assumes a specific value and the control device is also set up, so that it generates an evaluation signal as a function of the reference signal of the lambda control and monitors it with reference to surpassing or falling short of a threshold value.

13. The internal combustion engine according to claim 12, wherein the dependence of the supplied amount of fuel on the inflowing amount of air is a specified stoichiometric ratio between the air amount and fuel amount.

14. The internal combustion engine according to claim 12, wherein the control device operates during idle of the internal combustion engine.

15. The internal combustion engine according to claim 12, wherein the evaluation signal is generated by multiplication of the reference signal of the lambda controller by at least one correction value, which is generated as a function of at least one adaption value that is generated by the lambda control in specific operating phases of the internal combustion engine and used to influence the reference signal of the lambda control.

16. The internal combustion engine according to claim 15, wherein the at least one correction value is generated as a function of the change of at least one adaption value.

17. The internal combustion engine according to claim 15, wherein the control device generates a multiplicative adaption value that has a multiplicative effect during determination of the reference signal.

18. The internal combustion engine according to claim 15, wherein the control device generates an additive adaption value that acts additively during determination of the reference signal.

19. The internal combustion engine according to claim 15, wherein the control device generates the evaluation signal by multiplication of the reference signal of the lambda controller with a height correction value that is generated as a function of the level at which the internal combustion engine is situated.

20. The internal combustion engine according to claim 12, wherein the control device generates the evaluation signal by multiplication of the reference signal of the lambda controller with a temperature correction value that is generated as a function of the temperature of the internal combustion engine.

21. The internal combustion engine according to claim 12, wherein during the period of a measurement window, the control device measures a first time period, in which the evaluation signal exceeds the threshold value, and determines a second time period, in which the reference signal falls short of the threshold value, the difference between the first and the second time periods is referred to the duration of the measurement window to obtain a reference quantity, and the control device compares the reference quantity with an error threshold to detect a leak in the intake manifold.

22. The internal combustion engine according to claim 21, wherein the total time of the measurement window lasts 8 seconds and detection of a leak is only permitted after a minimum time period of 4 seconds.

* * * * *